US007976100B2

(12) United States Patent
Chen et al.

(10) Patent No.: US 7,976,100 B2
(45) Date of Patent: Jul. 12, 2011

(54) HANDLE DEVICE FOR INFANT CAR SEAT

(75) Inventors: Shun-Min Chen, Neihu (TW); Hong-Bin Xu, Neihu (TW)

(73) Assignee: Wonderland Nurserygoods Co., Ltd., Taipei (TW)

( * ) Notice: Subject to any disclaimer, the term of this patent is extended or adjusted under 35 U.S.C. 154(b) by 88 days.

(21) Appl. No.: 11/882,414

(22) Filed: Aug. 1, 2007

(65) Prior Publication Data

US 2008/0265633 A1 Oct. 30, 2008

(30) Foreign Application Priority Data

Apr. 26, 2007 (CN) ...................... 2007 2 0140341 U

(51) Int. Cl.
*A47C 31/00* (2006.01)

(52) U.S. Cl. ....................................... 297/183.6; 16/430

(58) Field of Classification Search ............... 297/183.1, 297/183.6; 16/110.1, 430, 421
See application file for complete search history.

(56) References Cited

U.S. PATENT DOCUMENTS

| | | | | |
|---|---|---|---|---|
| 5,658,044 | A * | 8/1997 | Krevh | 297/183.6 X |
| 6,119,309 | A * | 9/2000 | Lu | 16/430 X |
| 6,826,804 | B2 * | 12/2004 | Zaidman | 16/430 X |
| 7,278,182 | B2 * | 10/2007 | Wu | 16/113.1 |
| 2002/0108213 | A1 * | 8/2002 | Stegmaier | 16/430 |

* cited by examiner

*Primary Examiner* — Anthony D Barfield
(74) *Attorney, Agent, or Firm* — Davidson Berquist Jackson & Gowdey, LLP

(57) ABSTRACT

A handle device for an infant car seat includes a handle member and a pad. The handle member has two ends coupled respectively to two opposite sides of the infant car seat, and an inner surface formed with a positioning groove. The pad is disposed within the positioning groove in the handle member, and has a coupling face confronting the inner surface of the handle member, and a soft contact face opposite to the coupling face.

18 Claims, 13 Drawing Sheets

HANDLE DEVICE FOR INFANT CAR SEAT

CROSS-REFERENCE TO RELATED APPLICATION

This application claims priority of Chinese Application No. 200720140341.4, filed on Apr. 26, 2007.

BACKGROUND OF THE INVENTION

1. Field of the Invention

This invention relates to an infant car seat, and more particularly to a handle device for an infant car seat.

2. Description of the Related Art

Referring to FIG. 1, a conventional infant car seat 1 includes a seat portion 11 for accommodating an infant (not shown), and a handle 12 having two ends disposed respectively and pivotally on two opposite sides of the seat portion 11. The handle 12 is made of a plastic material, and is inverted U-shaped. The handle 12 is pivotable relative to the seat portion 11. A user is able to grasp the handle 12 to transport the infant car seat 1. From an ergonomic standpoint, when the user grasps the handle 12 to transport the infant car seat 1, bumping and frictional contact between the seat portion 11 and the body of the user occurs. This affects adversely the walking of the user. Also, because of the somewhat significant distance between the user and the infant and the awkward viewing angle, the user is unable to closely observe the infant. Therefore, the design of the infant car seat 1 is ergonomically unfavorable to the user during use.

Referring to FIG. 2, to reduce such adverse affection of the infant car seat 1 with respect to the walking of the user while permitting the user to conveniently observe and look after the infant, the handle 12 can be hooked on the bend of one elbow of the user. If this is done, however, since the handle 12 is made of a hard material, application of the total weight of the infant car seat 1 and the infant results in extreme discomfort at the portion of the arm of the user contacting the handle 12. Furthermore, since the handle 12 is plastic and therefore is impermeable to air, the arm of the user is apt to sweat. As a result, the arm of the user becomes slippery so that the handle 12 may slide on the arm of the user.

SUMMARY OF THE INVENTION

The object of this invention is to provide a handle device for an infant car seat that includes a pad, which is removable for cleaning and replacement, and which provides enhanced comfort when the handle device is hooked on the arm of a user.

According to an aspect of this invention, a handle device for an infant car seat is provided and comprises:

a handle member having two ends adapted to be coupled respectively to two opposite sides of the infant car seat, and an inner surface formed with a positioning groove; and a pad disposed within the positioning groove in the handle member and having a coupling face confronting the inner surface of the handle member, and a soft contact face opposite to the coupling face.

According to another aspect of this invention, a handle device for an infant car seat is provided and comprises:

a handle member having two ends adapted to be coupled respectively to two opposite sides of the infant car seat, and an inner surface formed with first and second positioning grooves disposed respectively at two opposite side portions thereof; and a first pad disposed within a selected one of the first and second positioning grooves in the handle member and having a coupling face confronting the inner surface of the handle member, and a soft contact face opposite to the coupling face.

BRIEF DESCRIPTION OF THE DRAWINGS

These and other features and advantages of this invention will become apparent in the following detailed description of the preferred embodiments of this invention, with reference to the accompanying drawings, in which.

DETAILED DESCRIPTION OF THE PREFERRED EMBODIMENTS

Figure 1:
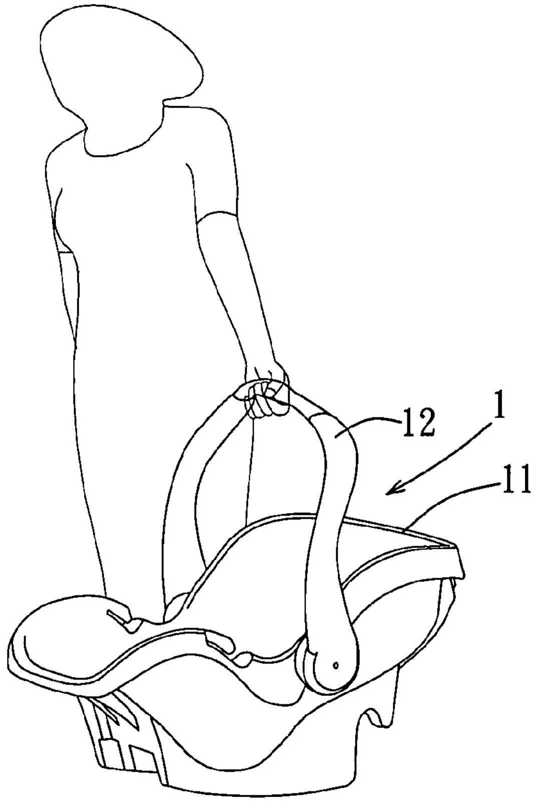
FIG. 1 is a perspective view of an infant car seat including a conventional handle, illustrating a user grasping the conventional handle.
Figure 2:
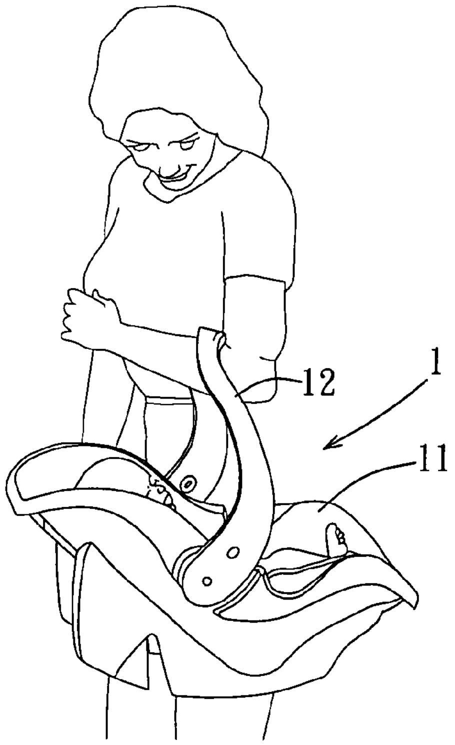
FIG. 2 is a perspective view of the infant car seat shown in FIG. 1, illustrating how the conventional handle is hooked on the bend of one elbow of the user.

Before the present invention is described in greater detail in connection with the preferred embodiments, it should be noted that similar elements and structures are designated by like reference numerals throughout the entire disclosure.

Figure 3:
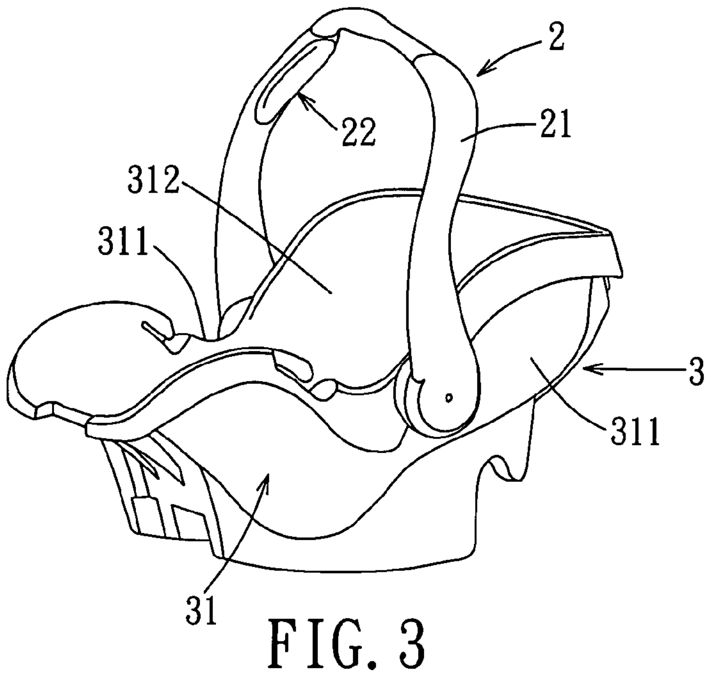
FIG. 3 is a perspective view of the first preferred embodiment of a handle device for an infant car seat according to this invention.
Figure 4:
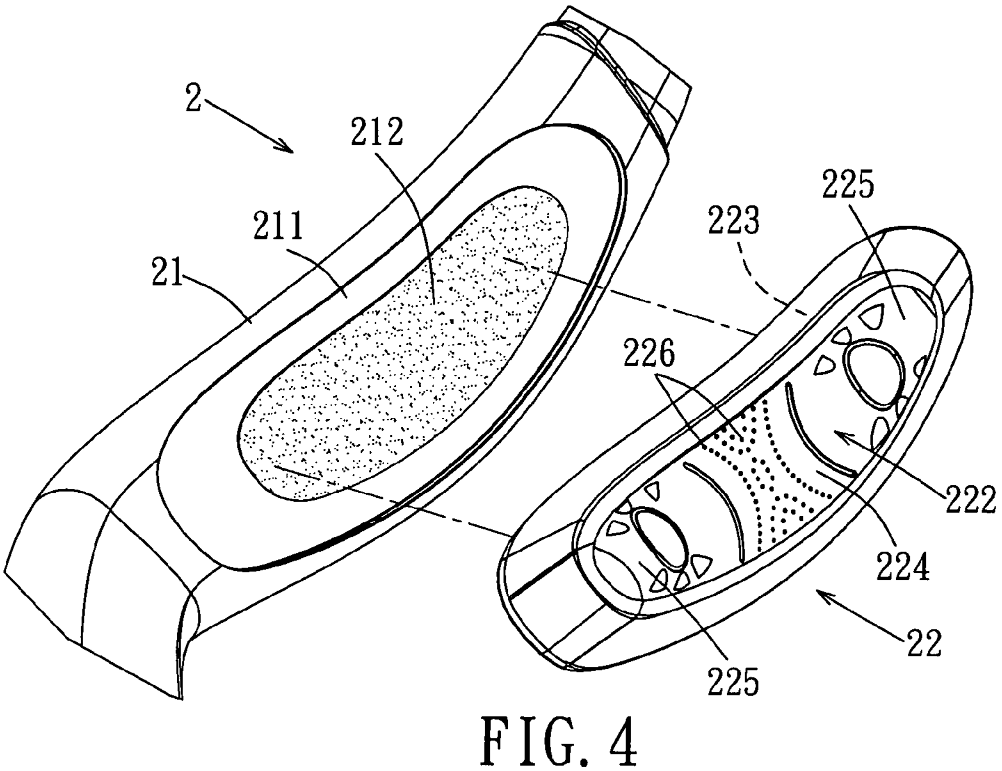
FIG. 4 is an exploded perspective view of a pad assembly of the first preferred embodiment.
Figure 5:
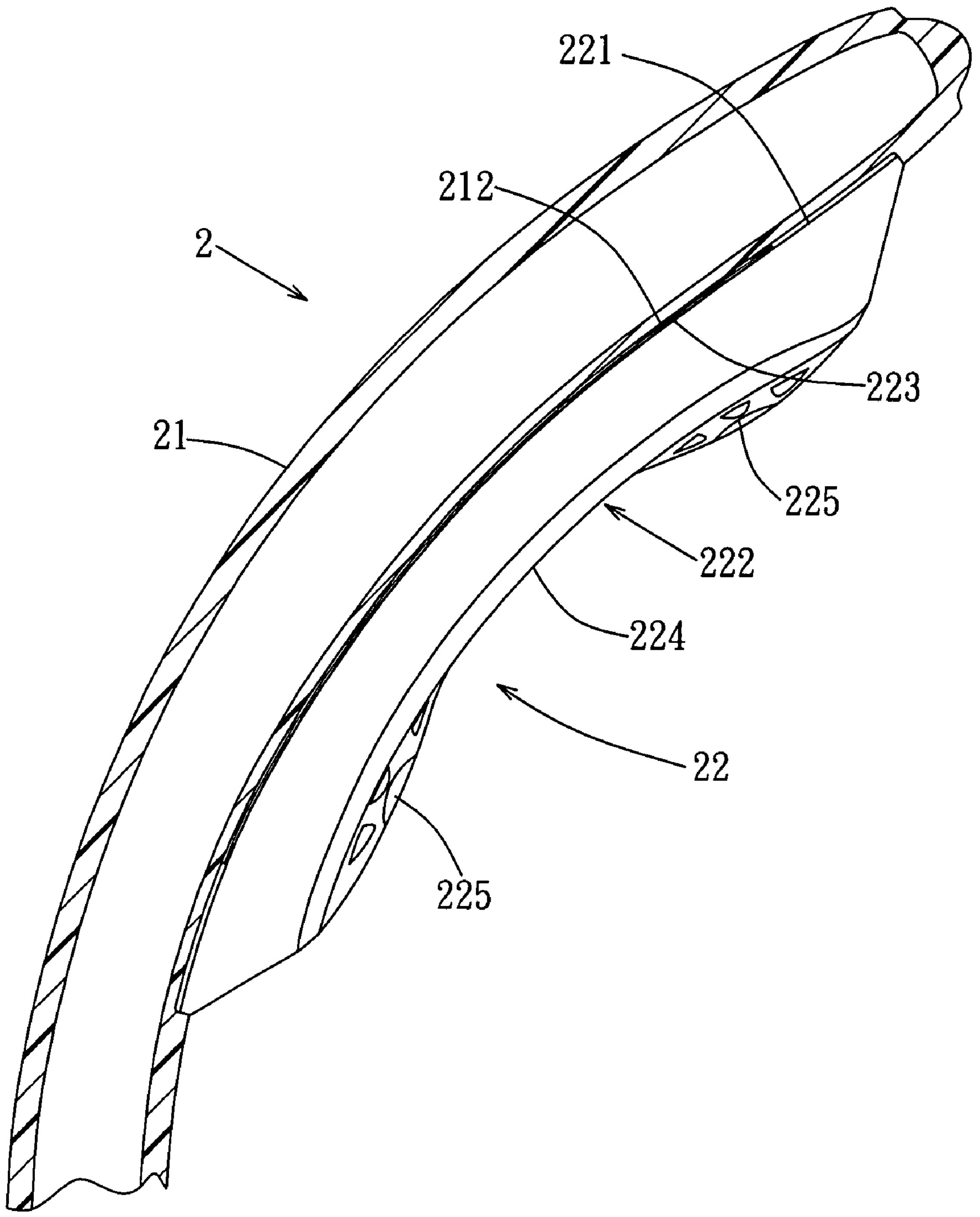
FIG. 5 is an assembled sectional view of the pad assembly of the first preferred embodiment.

Referring to FIG. 3, the first preferred embodiment of a handle device 2 according to this invention is used for an infant car seat 3 having a seat portion 31. The seat portion 31 has a plurality of sidewalls 311, and an accommodating space 312 defined by the sidewalls 311 for accommodating an infant (not shown). The handle device 2 includes a handle member 21 and a pad 22 mounted removably on the handle member 21. With further reference to FIGS. 4 and 5, the handle member 21 is made of a hard plastic material, and is inverted U-shaped. Two ends of the handle member 21 are disposed respectively and pivotally on outer surfaces of two opposite ones of the sidewalls 311 so as to allow for pivoting movement of the handle member 21 relative to the seat portion 31. The handle member 21 has an inner surface formed with a positioning groove 211, and includes a first fastening unit 212 disposed in the positioning groove 211. The pad 22 is disposed within the positioning groove 211, and has a coupling face 221 confronting the inner surface of the handle member 21, and a soft contact face 222 opposite to the coupling face 221. The pad 22 includes a second fastening unit 223 disposed on the coupling face 221 and coupled to the first fastening unit 212. The first fastening unit 211 cooperates with the pad 22 to constitute a pad assembly. In this embodiment, the first and second fastening units 212, 223 are configured respectively as two hook-and-loop fasteners that are interconnected removably.

To transport the infant car seat 3, a user can grasp the handle member 21. Alternatively, the handle member 21 can be hooked on the bend of one elbow of the user in such a manner that the arm of the user is in contact with the pad 22, as shown in FIG. 6. As shown in FIGS. 4 and 5, the contact face 222 of the pad 22 is formed with two swellings 225 disposed respectively at two opposite sides thereof to define a recessed area 224 at a middle portion of the contact face 222. As such, during use, the arm of the user is naturally brought into contact with the recessed area 224 to thus increase user comfort and prevent sliding movement of the handle device 2 on the arm of the user, particularly when the arm becomes slippery due to sweating of the arm.

Since the first and second fastening units 212, 223 are removable from each other, the pad 22 can be removed for cleaning or replacement with a new one of different color or for other purposes.

Figure 6A:
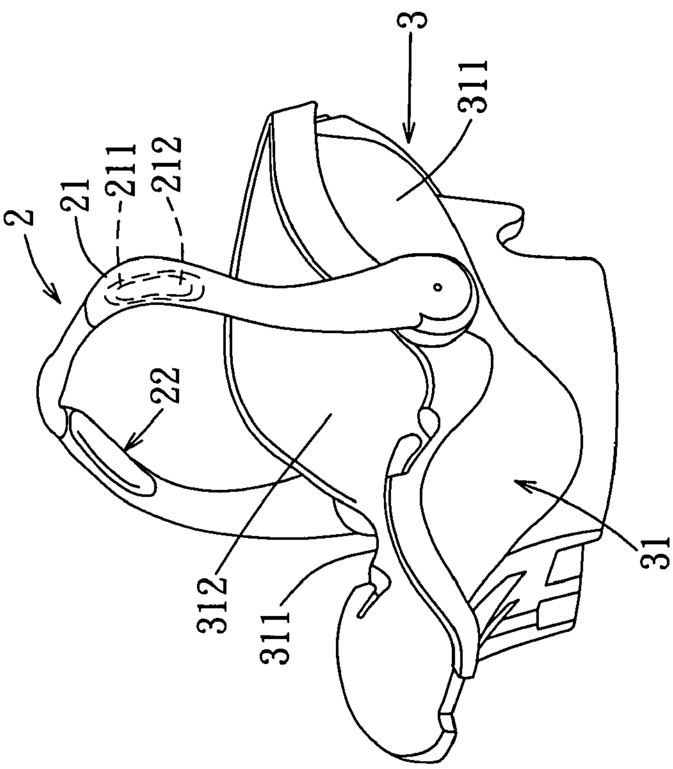
FIG. 6A is a perspective view of the second preferred embodiment of a handle device for an infant car seat according to this invention.
Figure 6:
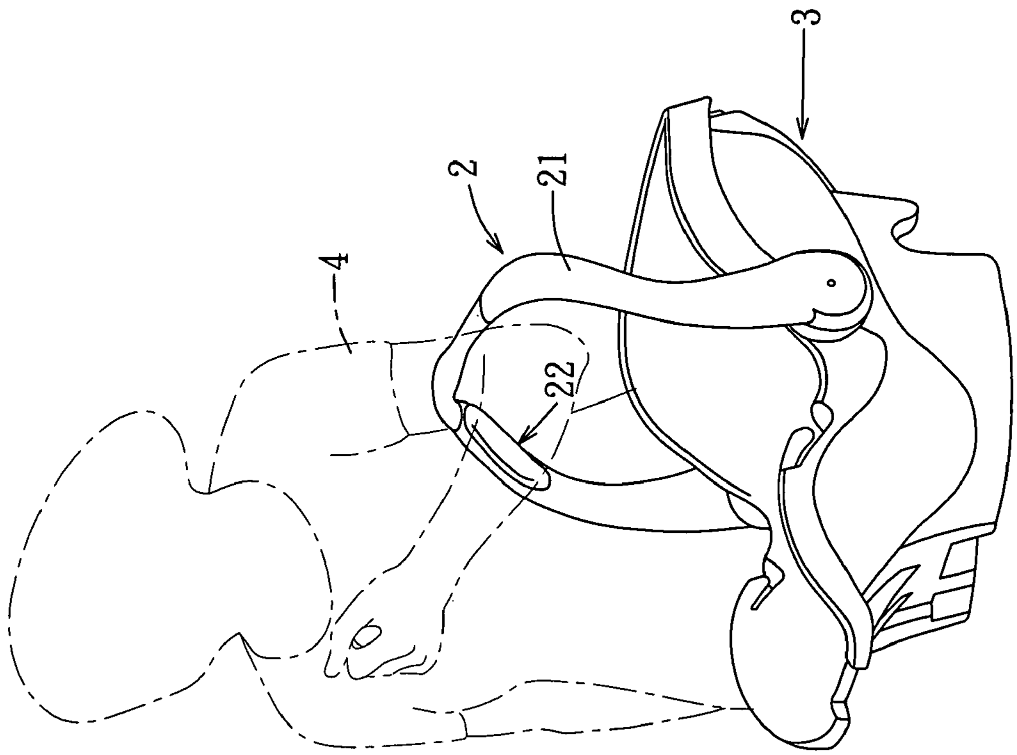
FIG. 6 is a perspective view of the infant car seat shown in FIG. 3, illustrating how the first preferred embodiment is hooked on the bend of one elbow of a user.

FIG. 6A shows the second preferred embodiment of a handle device 2 according to this invention, which is similar in construction to the first preferred embodiment except that the handle member 21 includes first and second positioning grooves 211 and two first fastening units 212 disposed respectively in the first and second positioning grooves 211. The pad 22 can be disposed within a selected one of the first and second positioning grooves 211 in the handle member 21.

Figure 7:
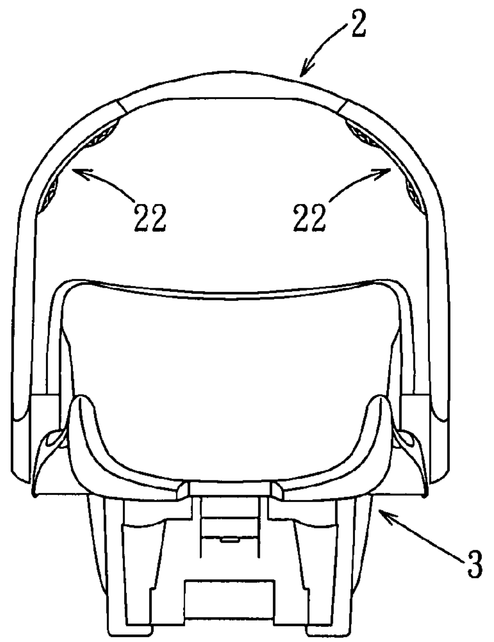
FIG. 7 is a front view of the third preferred embodiment of a handle device for an infant car seat according to this invention.

FIG. 7 shows the third preferred embodiment of a handle device 2 according to this invention, which is similar in construction to the second preferred embodiment except that this embodiment includes first and second pads 22 disposed respectively and removably within the first and second positioning grooves 211. With such a configuration, either the left or right sides of the handle member 22 can be hooked on the bend of the-elbow of the user, thereby enhancing convenience during use of the infant car seat 3.

Figure 8:
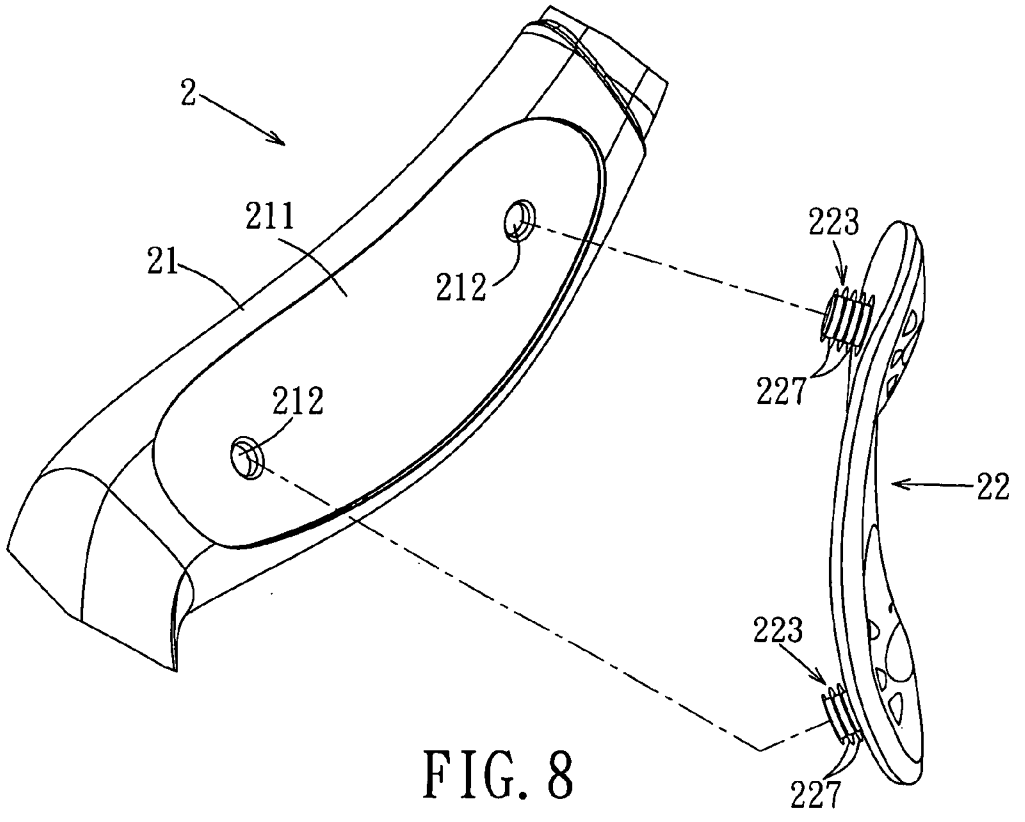
FIG. 8 is an exploded perspective view of a first modified pad assembly.
Figure 9:
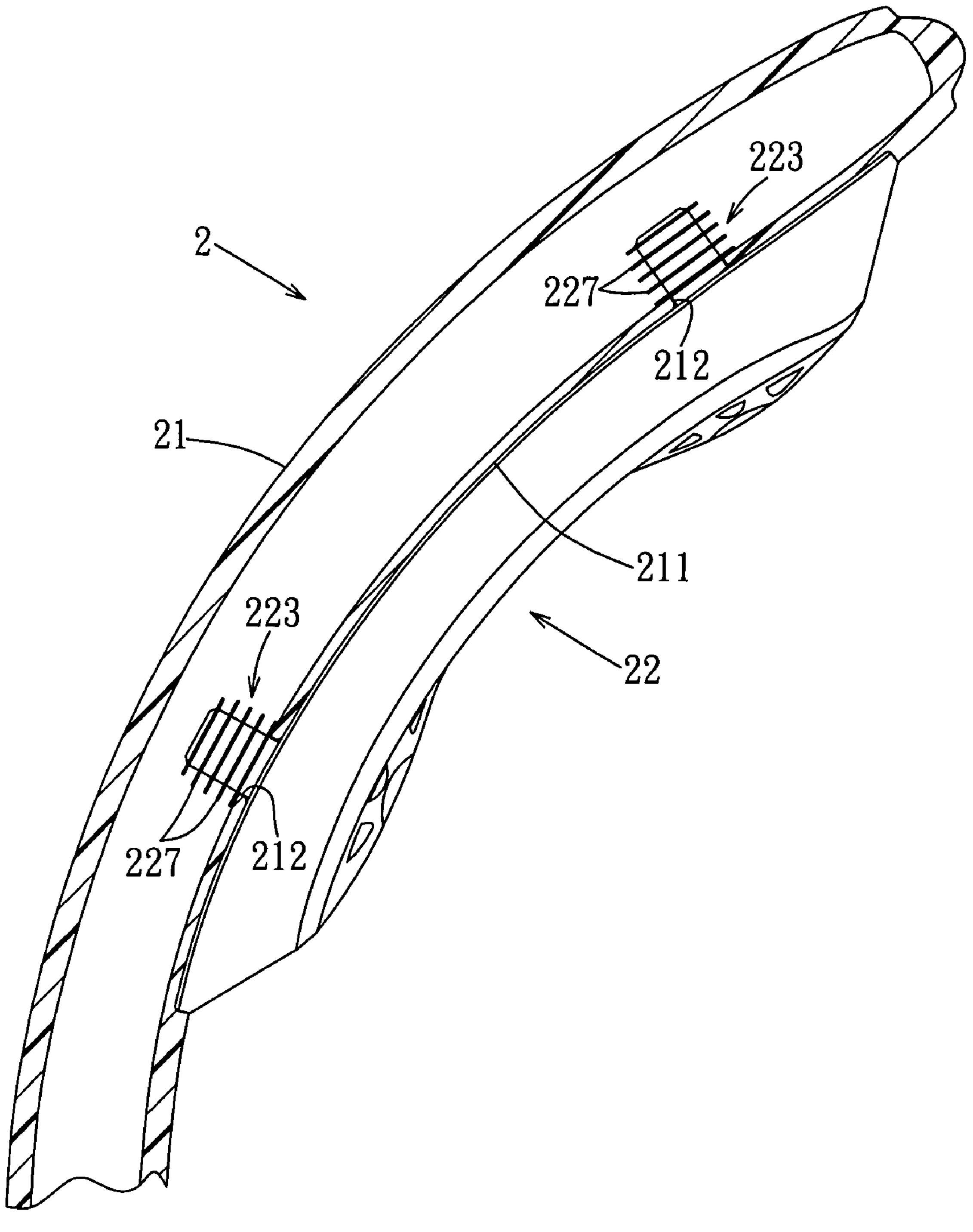
FIG. 9 is an assembled sectional view of the first modified pad assembly.

FIGS. 8 and 9 illustrate a first modified pad assembly, in which the first fastening unit 212 is configured as a hole in spatial communication with the positioning groove 211, and the second fastening unit 223 is configured as a flexible stub having a diameter slightly greater than that of the hole 212. The stub 223 has an annular peripheral surface formed with a plurality of interference flanges 227 extending radially and outwardly therefrom. As such, the stub 223 is capable of being forcibly press-fitted within the hole 212 to anchor the pad 22 to the handle member 21, after which the stub 223 may be forcibly removed from the hole 212 in order to detach the pad 22 from the handle member 21.

Figure 10:
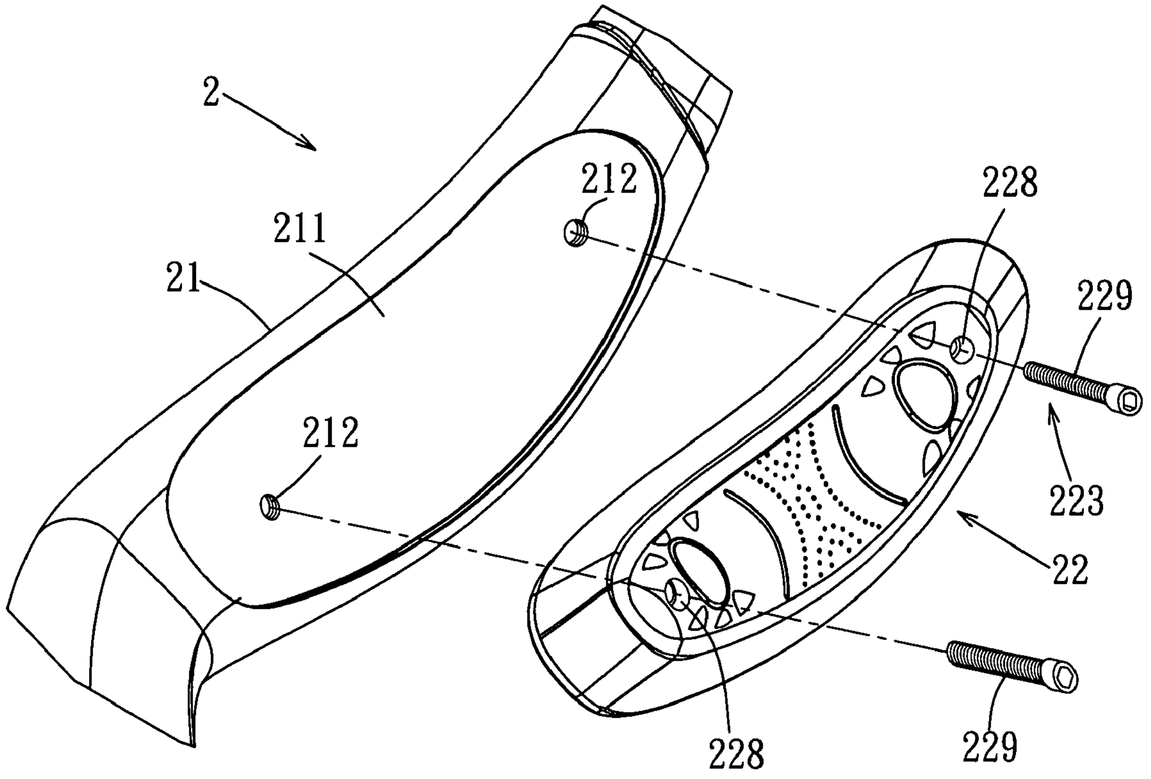
FIG. 10 is an exploded perspective view of a second modified pad assembly.
Figure 11:
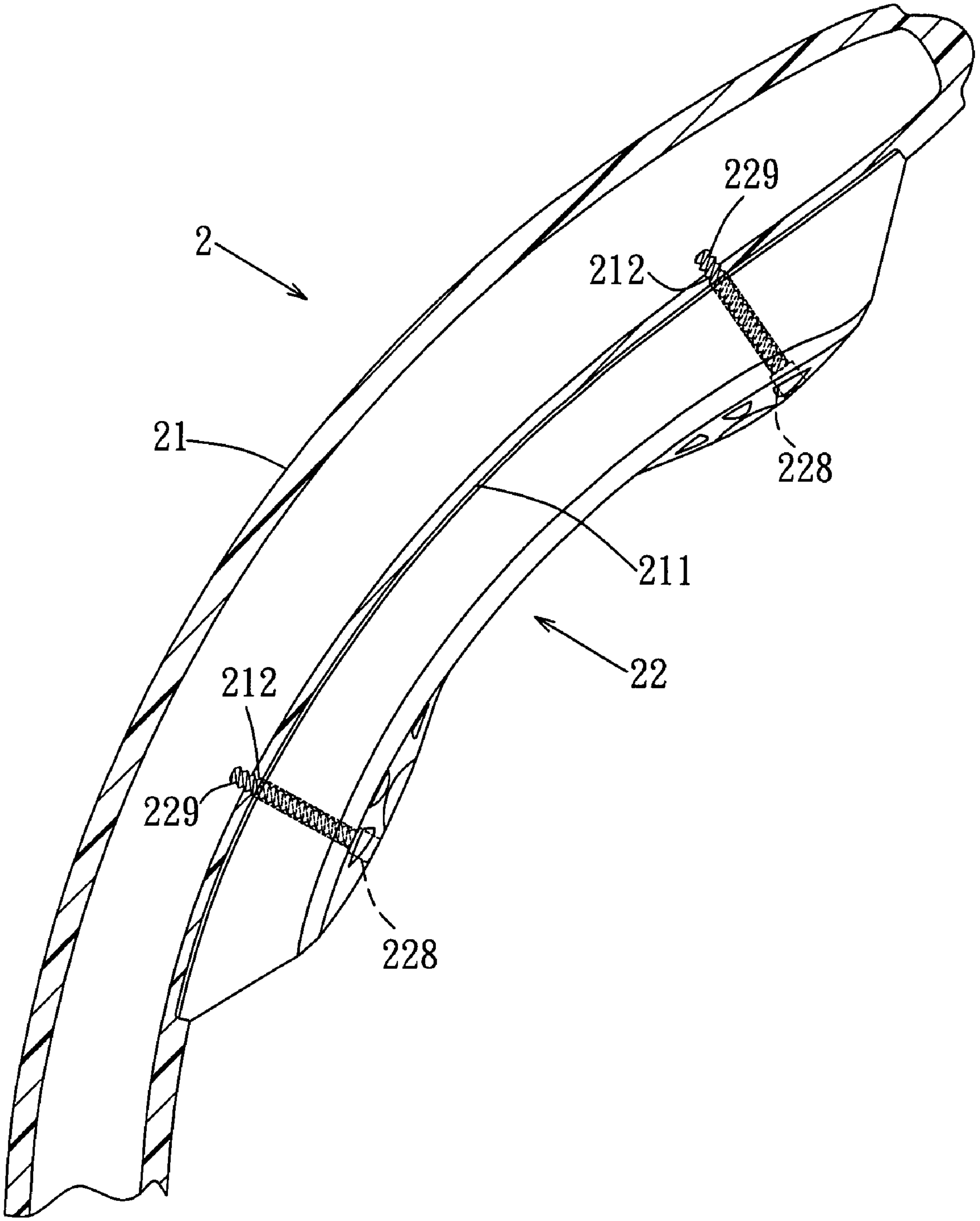
FIG. 11 is an assembled sectional view of the second modified pad assembly.

FIGS. 10 and 11 illustrate a second modified pad assembly, in which the first fastening unit 212 is configured as two threaded holes in spatial communication with the positioning groove 211, and the second fastening unit 223 includes two through holes 228 formed in the pad 22, and two bolts 229 extending respectively through the through holes 228 and engaging respectively the threaded holes 212.

Figure 12:
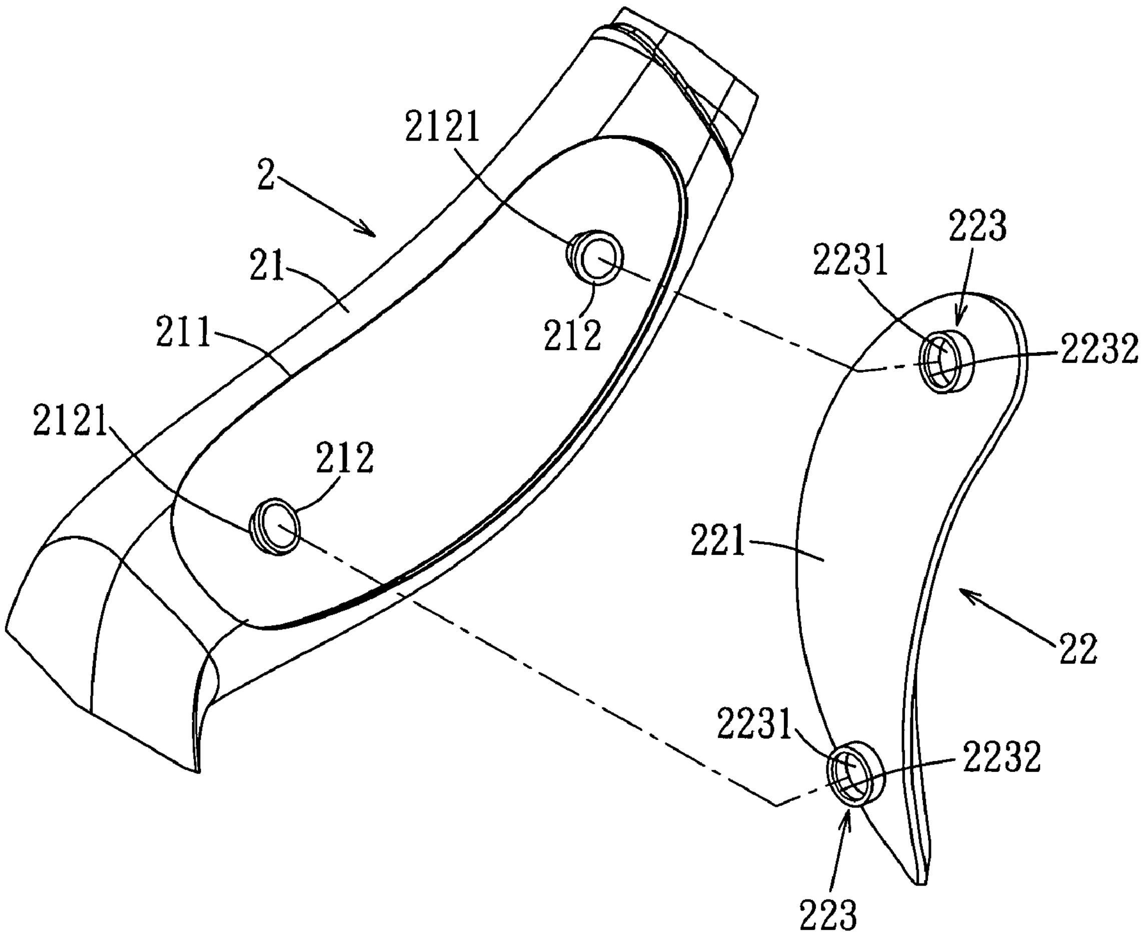
FIG. 12 is an exploded perspective view of a third modified pad assembly.
Figure 13:
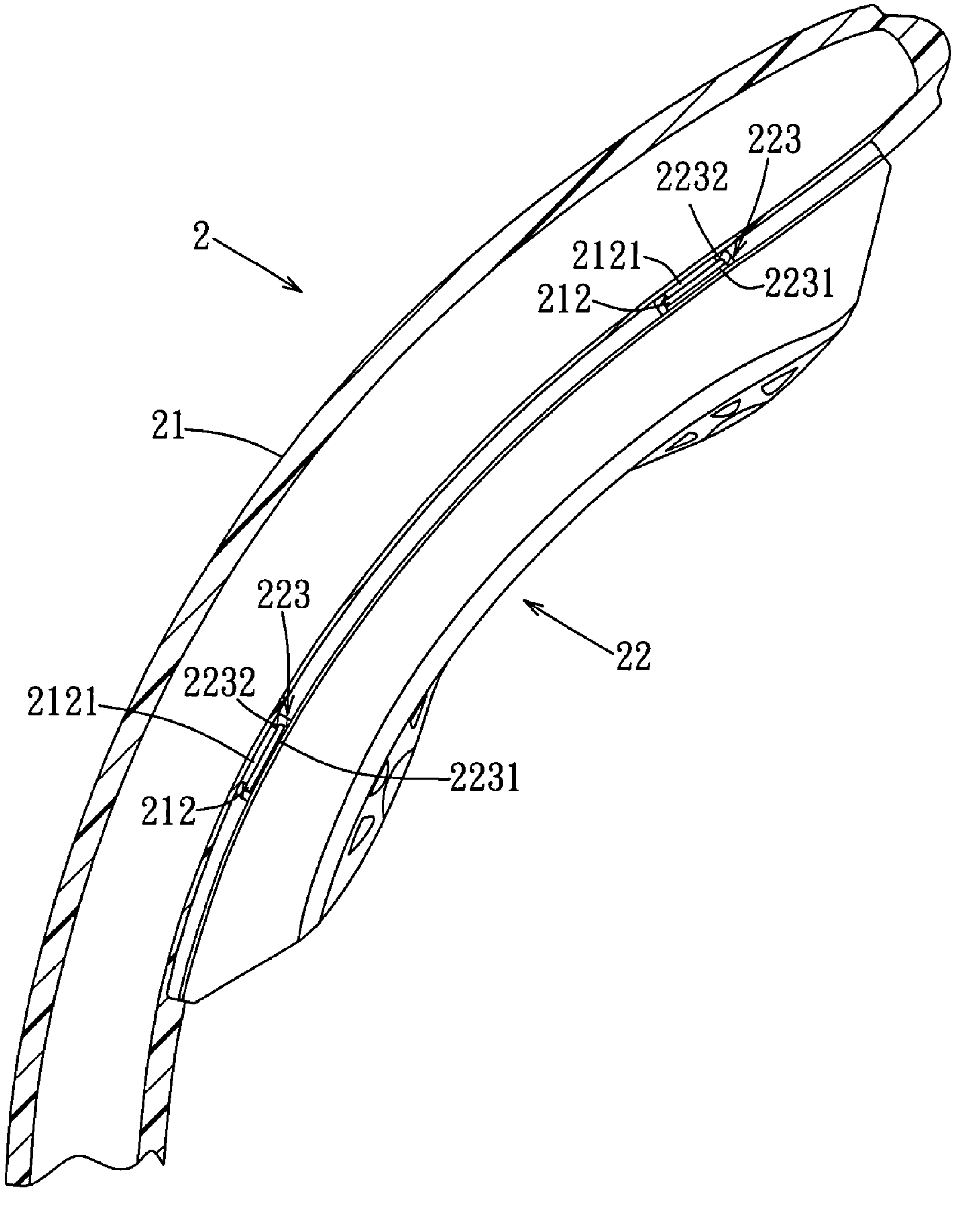
FIG. 13 is an assembled sectional view of the third modified pad assembly.
Figure 14:
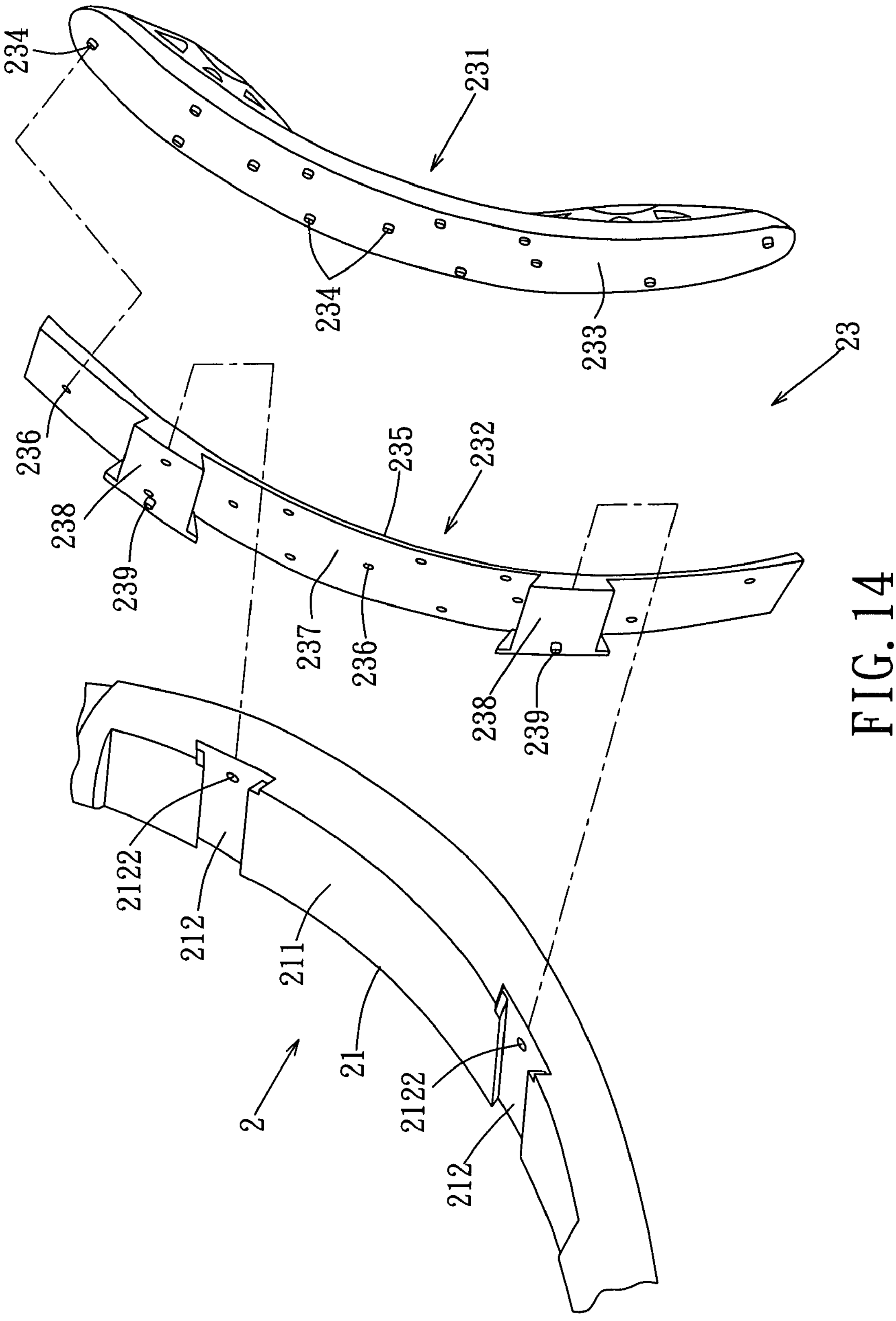
FIG. 14 is an exploded perspective view of a fourth modified pad assembly.
Figure 15:
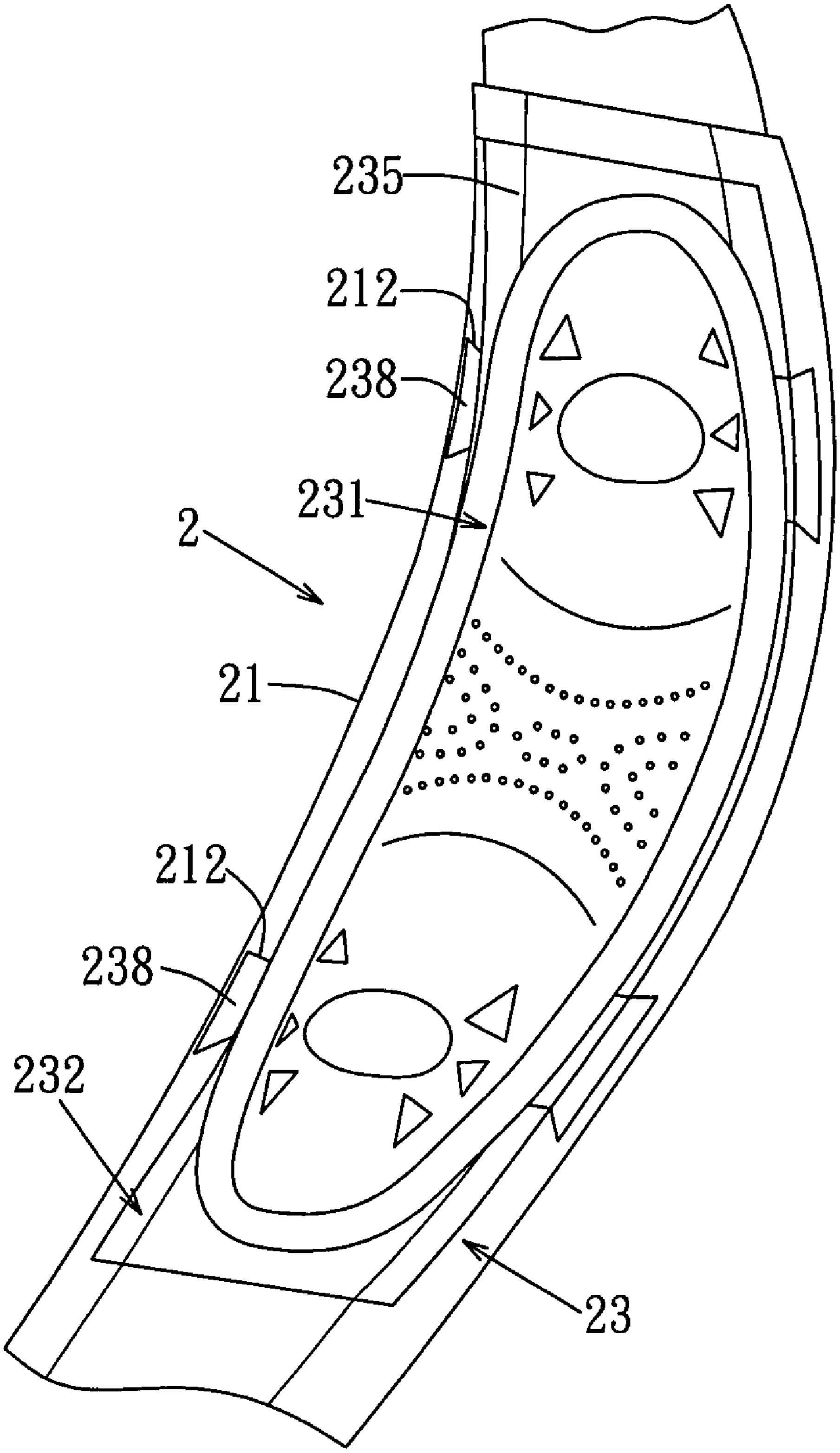
FIG. 15 is an assembled perspective view of the fourth modified pad assembly.
Figure 16:
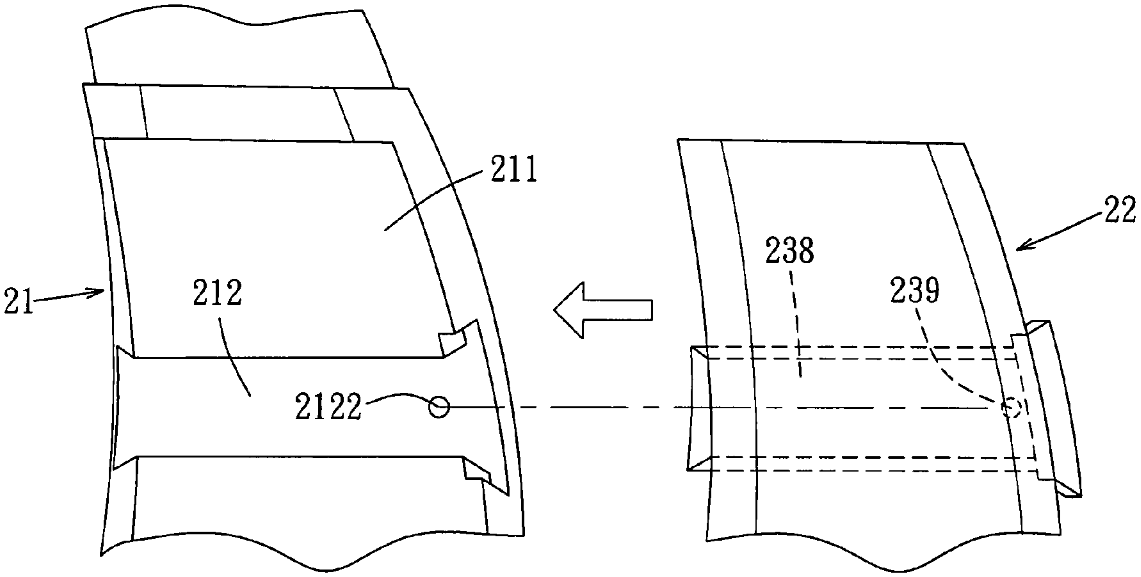
FIG. 16 is a schematic view of the fourth modified pad assembly, illustrating how to move a dovetail tongue into a dovetail groove.
Figure 17:
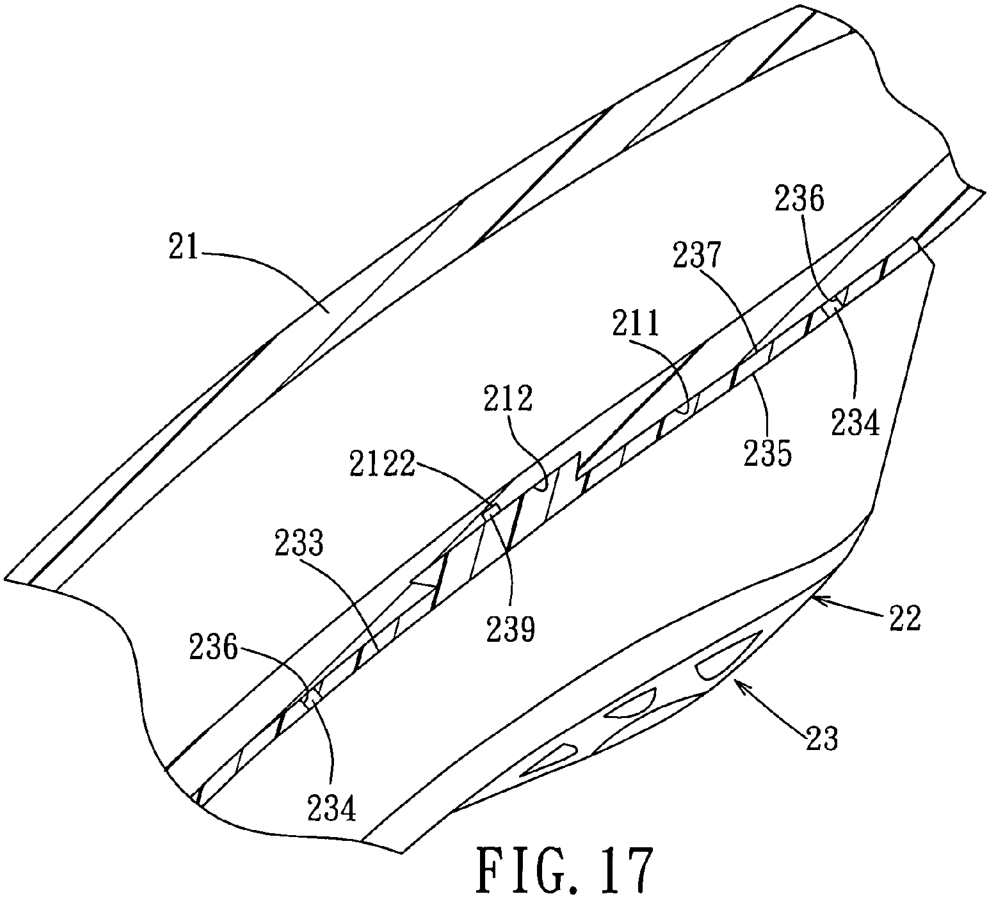
FIG. 17 is a fragmentary sectional view of the fourth modified pad assembly.

FIGS. 12 and 13 illustrate a third modified pad assembly, in which the first fastening unit 212 is configured as a plug that extends from the inner surface of the handle member 21 into the positioning groove 211. The plug 212 has an annular outer surface formed with an annular slot 2121. The second fastening unit 223 is configured as a sleeve extending from the coupling surface 221. The sleeve 223 is sleeved on the plug 212, and has an annular inner surface formed with a resilient flange 2232. The resilient flange 2232 extends radially and inwardly therefrom, and engages the slot 2121 in the plug 212.

FIGS. 14, 15, 16, and 17 illustrate a fourth modified pad assembly, in which the pad 22 includes a first pad portion 231 and a second pad portion 232 connected removably to the first pad portion 231. The first pad portion 231 has a first engaging face 233, and a plurality of coupling projections 234 disposed on the first engaging face 233. The coupling face 237 is disposed on the second pad portion 232. The second pad portion 232 further has a second engaging face 235 in contact with the first engaging face 233, and a plurality of connecting holes 236 formed through the second pad portion 232 and engaging respectively the coupling projections 234 so as to connect the first pad portion 231 to the second engaging face 235 of the second pad portion 232. The first and second pad portions 231, 232 are made of different materials. In this embodiment, the first pad portion 231 is made of thermoplastic elastomer (TPE), and the second pad portion 232 is made of polypropylene (PP).

In this embodiment, the first fastening unit 212 is configured as two dovetail grooves in spatial communication with the positioning groove 211, and the second fastening unit is configured as two dovetail tongues 238 extending from the coupling face 237 of the second pad portion 232 and engaging respectively the dovetail grooves 212. Each of the dovetail tongues 238 is formed with a positioning stub 239. The handle member 21 is formed with two insert holes 2122 that are in spatial communication with the dovetail grooves 212, respectively, and that engage respectively the positioning stubs 239. With such a configuration, the coupling face 237 of the second pad portion 232 is designed to have an area greater than that of the first engaging face 233 of the first pad portion 231 to thereby engage fittingly the positioning groove 212 in the handle member 21. Either the first or second pad portions 231, 232 can be replaced to allow for a change in colors thereof. This increases the diversity of the final handle device product. Alternatively, the second pad portion 232 may be omitted, in which case the second fastening unit in the form of dovetail tongues 238 is disposed on the first engaging face 233 of the first pad portion 231.

In view of the above, the handle device 2 of this invention is ergonomic to the arm of the user, and the pad 22 can be conveniently and quickly mounted to and removed from the handle member 21, thereby providing enhanced design flexibility and allowing for easy cleaning and replacement of the pad 22.

With this invention thus explained, it is apparent that numerous modifications and variations can be made without departing from the scope and spirit of this invention. It is therefore intended that this invention be limited only as indicated by the appended claims.

We claim:

1. A handle device for an infant car seat, said handle device comprising:

a handle member having two ends adapted to be rotatably coupled respectively to two opposite sides of the infant car seat, and an inner surface of the handle member being formed with an elongated first positioning groove; and a first pad disposed within and extending outwardly from said first elongated positioning groove, said first pad having a coupling face on one side confronting and being mounted within the first elongated positioning groove on said inner surface of said handle member, and a soft contact face on an opposite side for contacting a user lifting the infant car seat, wherein said contact face is formed with two spaced apart raised portions which are disposed respectively at two opposite ends thereof so as to define a recessed area there between at a middle portion of said contact face.

2. The handle device as claimed in claim 1, wherein said handle member includes a first fastening unit, and said first pad includes a second fastening unit coupled to said first fastening unit such that said first pad is disposed removably in said first positioning groove.

3. The handle device as claimed in claim 2, wherein said first fastening unit is configured as a hole, and said second fastening unit is configured as a flexible stub having a diameter slightly greater than that of said hole, said stub being press-fitted within said hole such that said first pad is anchored to said handle member.

4. The handle device as claimed in claim 3, wherein said stub has an annular peripheral surface formed with a plurality of interference flanges extending radially and outwardly therefrom.

5. The handle device as claimed in claim 2, wherein said first fastening unit is configured as a plug that extends from said inner surface of said handle member, said plug having an annular outer surface formed with an annular slot, said second fastening unit being configured as a sleeve that is sleeved on said plug and that has an annular inner surface, said annular inner surface being formed with a resilient flange that extends radially and inwardly therefrom and that engages said slot in said plug.

6. The handle device as claimed in claim 2, wherein said first fastening unit is configured as a threaded hole, and said second fastening unit includes a through hole formed in said first pad, and a bolt extending through said through hole and engaging said threaded hole.

7. The handle device as claimed in claim 2, wherein said first and second fastening units are configured respectively as two hook-and-loop fasteners that are interconnected removably.

8. The handle device as claimed in claim 2, wherein said first fastening unit is configured as a dovetail groove in spatial communication with said positioning groove, and said second fastening unit is configured as a dovetail tongue extending from said coupling face of said first pad and engaging said dovetail groove.

9. The handle device as claimed in claim 8, wherein said dovetail tongue is formed with a positioning stub, and said handle member is formed with an insert hole engaging said positioning stub.

10. The handle device as claimed in claim 2, wherein said first pad includes a first pad portion and a second pad portion connected removably to said first pad portion, said coupling face being disposed on said second pad portion, said first and second pad portions being made of different materials.

11. The handle device as claimed in claim 10, wherein said first pad portion has a first engaging face in contact with said second pad portion, and a plurality of coupling projections disposed on said first engaging face, said second pad portion having a second engaging face in contact with said first engaging face, and a plurality of connecting holes engaging respectively said coupling projections so as to connect said first pad portion to said second engaging face of said second pad.

12. The handle device as claimed in claim 1, further comprising a second pad, said inner surface of said handle member being further formed with a second positioning groove, said second pad being disposed within said second positioning groove in said handle member.

13. The handle device as claimed in claim 1 wherein the two spaced apart raised portions are spaced inwardly from respective ends of the first elongated positioning groove.

14. A handle device for an infant car seat, said handle device comprising:

a handle member having two ends adapted to be coupled respectively to two opposite sides of the infant car seat, and an inner surface formed with first and second positioning grooves disposed respectively at two opposite side portions thereof; and a first pad disposed within a selected one of said first and second positioning grooves in said handle member and having a coupling face confronting said inner surface of said handle member, and a soft contact face opposite to said coupling face;

wherein said contact face is formed with two spaced apart raised portions which are disposed respectively at two opposite ends thereof so as to define a recessed area there between at a middle portion of said contact face.

15. The handle device as claimed in claim 14, wherein said handle member includes a first fastening unit, and said first pad includes a second fastening unit coupled to said first fastening unit such that said first pad is disposed removably in said first positioning groove.

16. The handle device as claimed in claim 14, wherein further comprising a second pad disposed within the other of said first and second positioning grooves in said handle member and having a coupling face confronting said inner surface of said handle member, and a soft contact face opposite to said coupling face.

17. The handle device as claimed in claim 16, wherein said handle member includes a first fastening unit, and said first pad includes a second fastening unit coupled to said first fastening unit such that said first pad is disposed removably in said first positioning groove.

18. A handle device for an infant car seat, said handle device comprising:

a handle member having two ends adapted to be coupled respectively to two opposite sides of the infant car seat, and an inner surface formed with first positioning groove; and a first pad removably disposed within said first positioning groove in said handle member and having a coupling face confronting said inner surface of said handle member, and a soft contact face opposite to said coupling face;

wherein said contact face is formed with two spaced apart raised portions which are disposed respectively at two opposite ends thereof so as to define a recessed area there between at a middle portion of said contact face.

* * * * *